United States Patent [19]
Anderson et al.

[11] Patent Number: 5,405,452
[45] Date of Patent: Apr. 11, 1995

[54] MILK PIPELINE WASHING SYSTEM

[76] Inventors: Mitchell R. Anderson, 623-80 Front Street East, Toronto, Ontario, Canada, M5E 1T4; Ronald G. Forbes, RR 3, Ingersoll, Ontario, Canada, N5C 3J6

[21] Appl. No.: 17,471

[22] Filed: Feb. 12, 1993

[30] Foreign Application Priority Data

Feb. 13, 1992 [GB] United Kingdom ............. 9203020

[51] Int. Cl.⁶ ............................................. B08B 9/02
[52] U.S. Cl. .................... 134/22.12; 134/169 C; 134/98.1; 134/103.1; 134/26
[58] Field of Search ........... 134/98.1, 103.1, 166 C, 134/169 C, 22.12, 26

[56] References Cited

U.S. PATENT DOCUMENTS

| | | | |
|---|---|---|---|
| 2,558,628 | 6/1951 | Redin | 134/98.1 |
| 2,755,809 | 7/1956 | Mueller | 134/169 C X |
| 3,119,400 | 1/1964 | Bihler | 134/169 C |
| 3,417,763 | 12/1968 | Fjermestad et al. | 134/169 C X |
| 3,670,744 | 6/1972 | Bender | 134/169 C |
| 3,916,923 | 11/1975 | Branton | |
| 4,832,752 | 5/1989 | Ngzwurski | 134/166 C |

FOREIGN PATENT DOCUMENTS 1045376  10/1966  United Kingdom .

OTHER PUBLICATIONS

European Patent 239,468 Sep. 1987.

*Primary Examiner*—Frankie L. Stinson
*Attorney, Agent, or Firm*—Anthony Asquith & Co.

[57] ABSTRACT

After a milking, the milking apparatus is cleaned in stages. First, the remaining milk is rinsed out with water. Second, the apparatus is washed through with detergent. The first stage rinse is very thorough, so that the second stage wash leaves the detergent solution still quite clean. The solution is stored in a separate tank between washes, and used again the next wash. Only a small make-up quantity of detergent need be added. Substantial savings in detergent discharges are achieved. The acid flush solution and the sanitizer flush solution also may be similarly stored for re-use. The detergent solution may be heated prior to re-use by heat from the milk.

14 Claims, 3 Drawing Sheets

MILK PIPELINE WASHING SYSTEM

This invention relates to the cleaning of milking machines on dairy farms.

BACKGROUND TO THE INVENTION

In a typical conventional dairy farm, milk is drawn from the many cows through the individual milking units, and into the milk suction pipelines by vacuum. From the milk suction pipelines, the milk enters a receiving jar. A pump draws milk from the receiving jar (against the vacuum) and transfers the milk, via the milk delivery pipe, to the bulk-holding-tank in which the milk is stored pending collection and transport to the dairy.

The suction pipelines are disposed around the cow shed, and have hook-on valves at the appropriate milking stations. For milking, the attendant couples the individual milking units to the (overhead) suction pipeline.

After milking, the individual milking units and the suction pipeline system have to be rinsed through, washed, and thoroughly cleansed. The attendant removes the individual milking units to the milk-house cleaning station, where water and detergent can be flushed through the milking units and their hook-up pipes. The overhead suction pipeline system also must be washed through.

Before commencing washing, the attendant swings the milk-delivery-pipe out from the bulk-holding-tank, and arranges that the milk-delivery-pipe now discharges into the milk-house sink (and thence to the drains).

The washing process may be regarded as having three stages: first, a rinse-through with water, to clear out the main volume of liquid milk remaining in the pipelines and milking units; second, a washing cycle, in which water containing a detergent is circulated through the pipelines and milking units; and third, a post-wash stage, in which an acid solution is flushed through the pipelines and milking units to neutralise the increased pH caused by the alkaline detergent. Also, a sanitizer may be flushed through the system.

In the first-rinse-stage, the milk and rinse-water are discharged to the drains. In the conventional detergent-wash-stage, a charge of fresh water enters the sink, and a measured volume of detergent is mixed with the water. The water re-circulates around the pipeline system and milking units for several minutes. In the conventional apparatus, the washing solution is allowed to drain away. In the post-wash stage, a fresh charge of water is mixed with the neutralising acid chemicals; this is then re-circulated around the pipeline system for a few minutes, and finally discharged from the sink to the drains.

The whole washing action is carried out twice a day, and over a period of time substantial quantities of detergent and chemicals are used. At a farm, the drains into which the liquids from the washing process are discharged are generally of the septic tank type, in which the effluent soaks into the surrounding ground. The septic system copes well enough with the discharged milk, but sometimes it is observed that the detergent chemicals are not fully broken down. The detergent residues can, after a period of years, pollute the ground around the septic tank effluent area. Furthermore, the residue may enter the groundwater, and may pollute streams, wells, etc and the general water system. The acid chemicals also are sometimes not fully treated in the septic system.

It is therefore desirable to reduce the quantity of chemicals used in the washing process. Also, apart from the pollution considerations, the detergent and chemicals are expensive, and reducing the quantity required has a direct economic benefit.

On the other hand, of course the standards of cleanliness to be achieved by the washing process cannot be compromised. Milk is very prone to deterioration because of bacterial action, and the only effective safeguard against that is scrupulous cleanliness. Also, the way milk collection and testing is typically carried out, a bacterial deterioration might not be picked up until the milk has been mixed with that from many farms, in which case large quantities of the good milk would be also affected.

The invention is aimed at providing a system for washing milk pipelines and milking units which requires smaller quantities of detergent than the conventional systems, but which achieves the same standards of washing efficiency.

BASIC FEATURES OF THE INVENTION

In the invention, the three stages of the washing process are present; namely, the first-rinse-stage, the detergent-wash-stage, and post-wash stage which includes the neutralising-flush-stage. In the invention, a storage tank is provided for containing the wash-liquid used in the detergent-wash-stage, and for storing the wash-liquid between washes.

In the invention, the major portion of the liquid milk remaining in the pipelines and other components after milking is rinsed away in the first-rinse-stage. No detergent need be used in the first-rinse-stage. Once the rinse liquid is running reasonably clear, the first rinse-stage is over. Valves in the system now are set (preferably by an automated timer or other controller) so as to transfer liquid from a storage-tank provided for the purpose, and the liquid from the storage-tank is circulated around the system during the detergent-wash-stage. The savings of the invention arise because the liquid in the storage-tank is the detergent-wash-liquid that was used last time the milking equipment was washed.

It has been found that if the detergent-wash-phase is carried out after the pipelines and components have been well-rinsed through, then much of the efficacy of the detergent still remains after the detergent-wash-phase has been completed. In the invention, the detergent-wash-liquid, being a mixture of water, detergent, and whatever has been picked up from washing the pipelines and other components, is stored between washes. It has been found that the stored liquid is almost as efficacious as a charge of fresh water mixed with a charge of fresh detergent.

In a typical example of a conventional washing system, the quantity of detergent required is about 0.5 kilogram per hundred liters of wash water, each wash. In the conventional system, this whole quantity of detergent is discharged into the environment, each wash. In that same system, if a storage-tank is provided and if the change is made, as in the invention, to storing the wash liquid in the tank between washes, then it is found that only about 100 gm of detergent need be added, every two washes, to bring the batch of detergent-wash-liquid up to the required detergent strength.

The batch of detergent-wash-liquid cannot be replenished in this way for ever, of course. However, it is recognised that only a simple test is required to pipeline 10B is fed, namely a simple pH determination. It is not necessary for the attendant to carry out anything so difficult as a bacteria count or the like to determine when a fresh batch of detergent-wash-liquid should be made up. In fact, the prudent farmer would generally prefer to set up a routine whereby he discards the detergent solution and makes up a fresh batch of detergent solution say every six washes, but maintains a check on the pH to see whether abnormal conditions would require more frequent changes.

The savings in the quantity of detergent are plain. The savings are made possible by making sure the pipelines are well rinsed-through before commencing the detergent-wash stage, and by storing the detergent-wash-liquid (ie only the detergent-wash-liquid) between washes. Thus, in the invention, there has to be a clear demarcation between the first-rinse-stage and the detergent-wash-stage. The first-rinse-liquid is discarded every wash; the detergent-wash-liquid is kept in the storage-tank for as many as six washes, typically, and is kept efficacious throughout that time by the addition of only comparatively tiny make-up amounts of detergent.

The first-rinse is a thorough rinse, which clears out substantially all the remaining solid components of the milk. As a result, the detergent-wash-liquid at the end of the subsequent wash-stage is nearly as clean as when the wash-stage started. The thoroughness of the first-rinse is an important factor in whether the detergent-wash-liquid can be used over and over.

The third stage of the washing cycle, ie the post-wash stage, includes a neutralising-flush-stage, which sends acid chemicals around the pipelines and components, to serve to neutralise the alkalinity left by the detergent. These neutralising chemicals can be harmful to the environment, and of course they cost money, and so the requirement to save on the use of these chemicals also can arise on many farms, similar to the requirement as described to save on the use of detergent. However, the major benefits come from reducing the detergent first.

If it is decided to make savings also on the quantity of neutralising chemicals, a neutralising-chemicals-storage-tank is provided. The neutralising-flush-liquid is stored in this tank between washes. Chemicals are added to the contents of the tank from time to time to maintain the correct acidity. During all stages of the washing cycle, the valves and controllers to control the flow of the liquids is such as to ensure that the detergent-wash-liquid does not enter the neutralising-flush storage-tank, and that the neutralising-flush-liquid does not enter the detergent-wash storage-tank.

A similar separate storage tank can also be provided for the sanitizer-flush-liquid, if desired. Again, the sanitizer-flush-liquid must be kept separate from the detergent-wash-liquid, and from the neutraliser-flush-liquid.

DETAILED DESCRIPTION OF PREFERRED EMBODIMENT

By way of further explanation of the invention, exemplary embodiments of the invention will now be described with reference to the accompanying drawings, in which.

Figure 1:
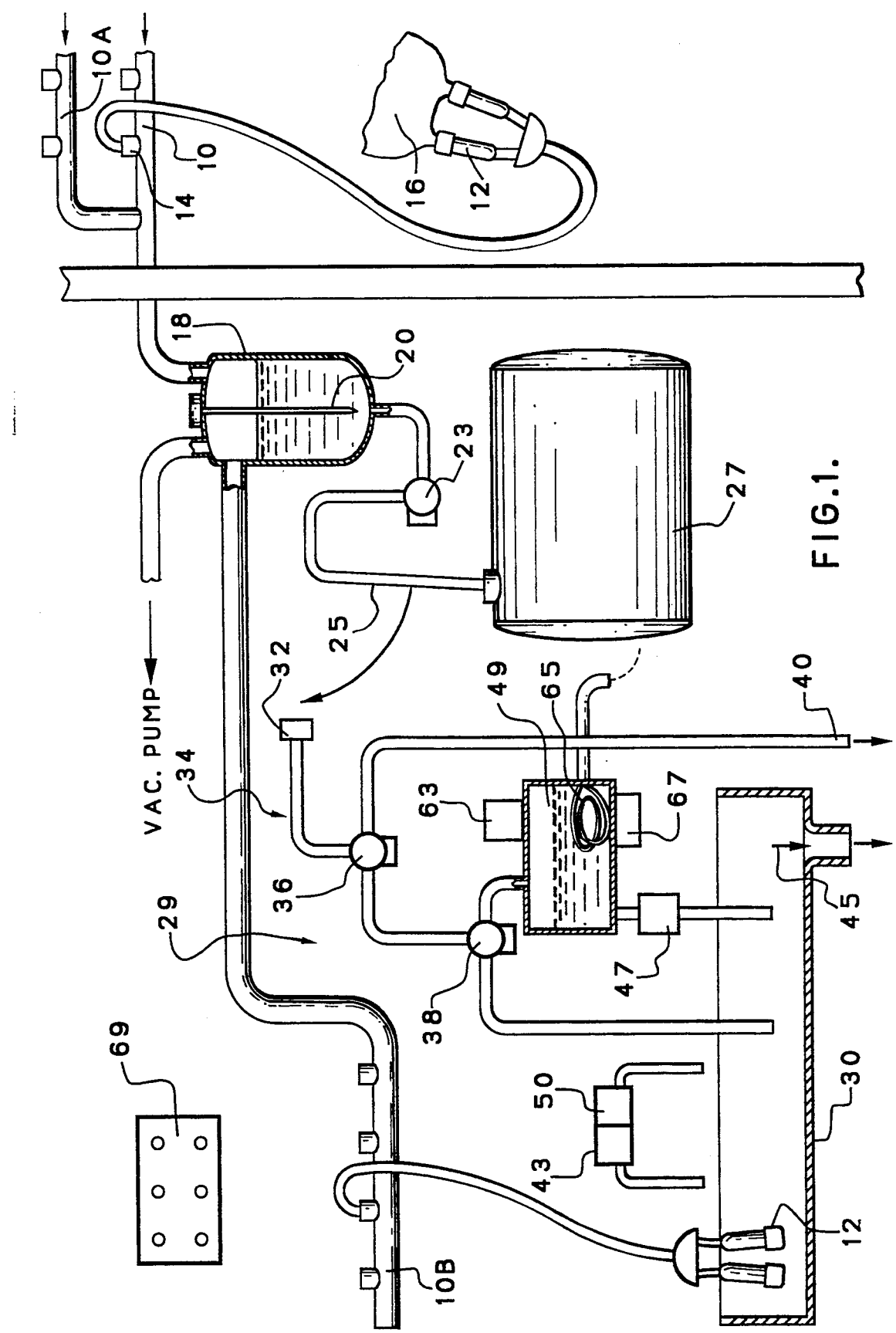
FIG. 1 is a diagram of a dairy-farm milking set-up and washing system which incorporates the principles of the invention.

The apparatuses and procedures shown in the accompanying drawings and described below are examples which embody the invention. It should be noted that the scope of the invention is defined by the accompanying claims, and not necessarily by specific features of exemplary embodiments.

The cow-shed is fitted with overhead vacuum suction pipelines 10. For milking, a milking unit 12 is coupled to a convenient one of the self-sealing hook-up points 14 located in the pipeline 10. The milking unit 12 is coupled to the cow's udder 16. Milk is drawn by vacuum suction into the pipeline 10 and thence into the receiving jar 18.

In addition to the suction pipelines 10 for drawing off the milk, a second system of vacuum pipes (not shown) is included in the cow-shed for operating the pulsators on the milking units. However, since milk does not enter the pulsator piping system, that system does not have the requirement for stringent regular washing.

Milk collects in the receiving jar 18. When indicated by a depth gauge 20, excess milk in the receiving jar is pumped out (against the vacuum) by means of a delivery pump 23. The pumped milk is transferred, via a milk-delivery-pipe 25, to a bulk-holding-tank 27.

As each cow is milked, the milking unit 12 is moved along the suction pipeline 10 to the next cow. Six or more milking units may be in use simultaneously. The pipeline system includes branches 10A as appropriate to the size and shape of the cow-shed.

When the cows are all milked, the milking units 12 are brought into the milk-house cleaning station 29, and placed in the milk-house sink 30, for washing. The milking units 12 are hooked up to a section of the suction pipeline 10B provided for the purpose above the milk-house sink 30.

Prior to commencing the washing cycle, the milk-delivery-pipe 25 is physically moved from the bulk-holding-tank 27 to a port 32 of a wash-piping-layout 34. Of course, the liquids used in the washing cycle must not be allowed to enter the bulk-holding-tank.

The first stage of the washing cycle is the first-rinse-stage, and it is carried out as follows. The pipelines 10 and the milking units 12 still contain large quantities of milk. The vacuum pump (not shown) and the delivery pump 23 are set in operation, whereby liquids present in the pipelines and milking units are drawn into the receiving jar 18, through the milk-delivery-pipe 25, and into the wash-piping-layout 34.

The flow of liquids through the wash-piping-layout 34 is controlled by first and second flow-directing valves 36,38. For this first-rinse-stage, valve 36 is set so as to direct the flow entering the port 32 out through a discharge pipe 40, and to drain.

During the first-rinse stage, water may be admitted into the milk-house sink 30 via an inlet 43. This water is drawn up, by the vacuum, through the milking units 12 present in the sink, and into the suction pipelines 10. The water rinses through the components, and carries away traces of liquid (and solid) milk particles remaining in the components. The rinse water is discharged to drain through the discharge pipe 40. Re-circulating the rinse water through the sink and through the components would not normally be contemplated. No detergent is added to the water in this first-rinse-stage.

When the water discharged from the pipe 40 is running clear, the first stage may be brought to an end. The sink 30 is emptied, either through the drain-plug 45 or by being pumped out of the discharge pipe 40. (The end of the first stage may be set by a timer, rather than by observation.)

The next stage is the detergent-wash-stage. This is prepared by setting valve 36 to close off the discharge pipe 40. An on/off valve 47 is opened, and detergent solution present in a storage tank 49 falls under gravity into the milk-house sink 30. Valve 38 is set so as to divert liquids entering the port 32 into the storage tank 49.

Now, the detergent liquid that came from the storage tank 49 enters the milking units 12, and is circulated around the pipelines 10 and other components. The returning liquid enters the port 32, and is diverted into the storage tank 49, whence it flows through the valve 47, and once more into the sink 30. Thus, the detergent liquid from the storage tank 49 is circulated and re-circulated around the components, so long as the valve 47 remains open.

At the end of the detergent-wash-stage, the valve 47 is closed, and the detergent-wash-liquid collects once more in the storage tank 49, the sink 30 then being again empty.

The third stage is the neutralising-flush-stage. Water is taken into the sink 30, and a charge of neutralising chemicals is added to the water from an acid box 50. The valves 36,38 are set for the third stage so that water entering the port 32 passes straight down to the sink 30, without entering the detergent-wash-liquid storage-tank 49.

The flush liquid now is drawn up into the milking units 12, and circulates around the components. The liquid returns to the sink 30, and is re-circulated. At the end of the neutralising flush stage, the neutralising liquid is discharged, either through the discharge pipe 40 under the control of the valve 36, or by un-plugging the milk-house sink at 45.

Another aspect of the third stage is a sanitizer-flush-stage. This is basically the same as the neutralising-flush-stage, except that sanitizer chemicals are used. The sanitizer-flush-liquid is discharged after the sanitizer-flush-stage.

Figure 2:
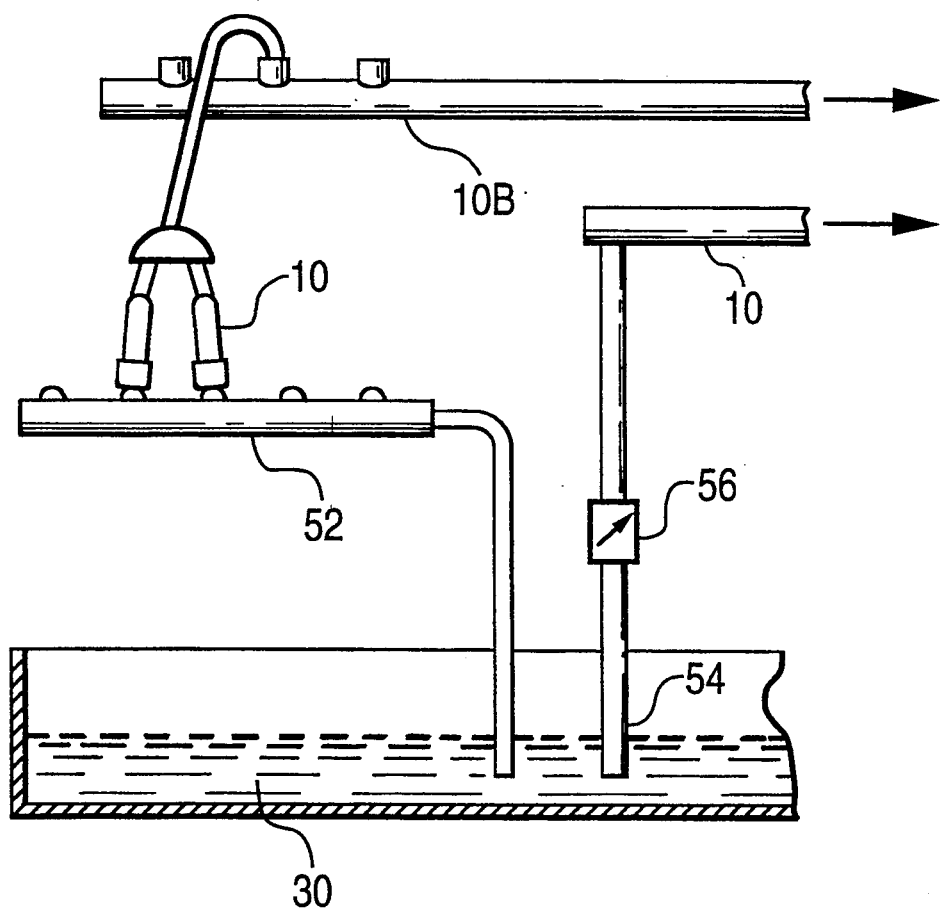
FIG. 2 is a diagram corresponding to a portion of FIG. 1, showing an alternative arrangement.

FIG. 2 shows an alternative arrangement of milking system, in which the milking units to be washed are not placed in the milk-house sink for washing, but are placed in a separate wash tray 52. Also in FIG. 2 the pipeline 10B is are fed directly with liquid from the sink 30 via a draw-off pipe 54. A balance valve 56 is incorporated into the pipe 54, whereby adequate flows of the liquids can be maintained both in the pipeline 10B and in the wash tray 52.

Figure 3:
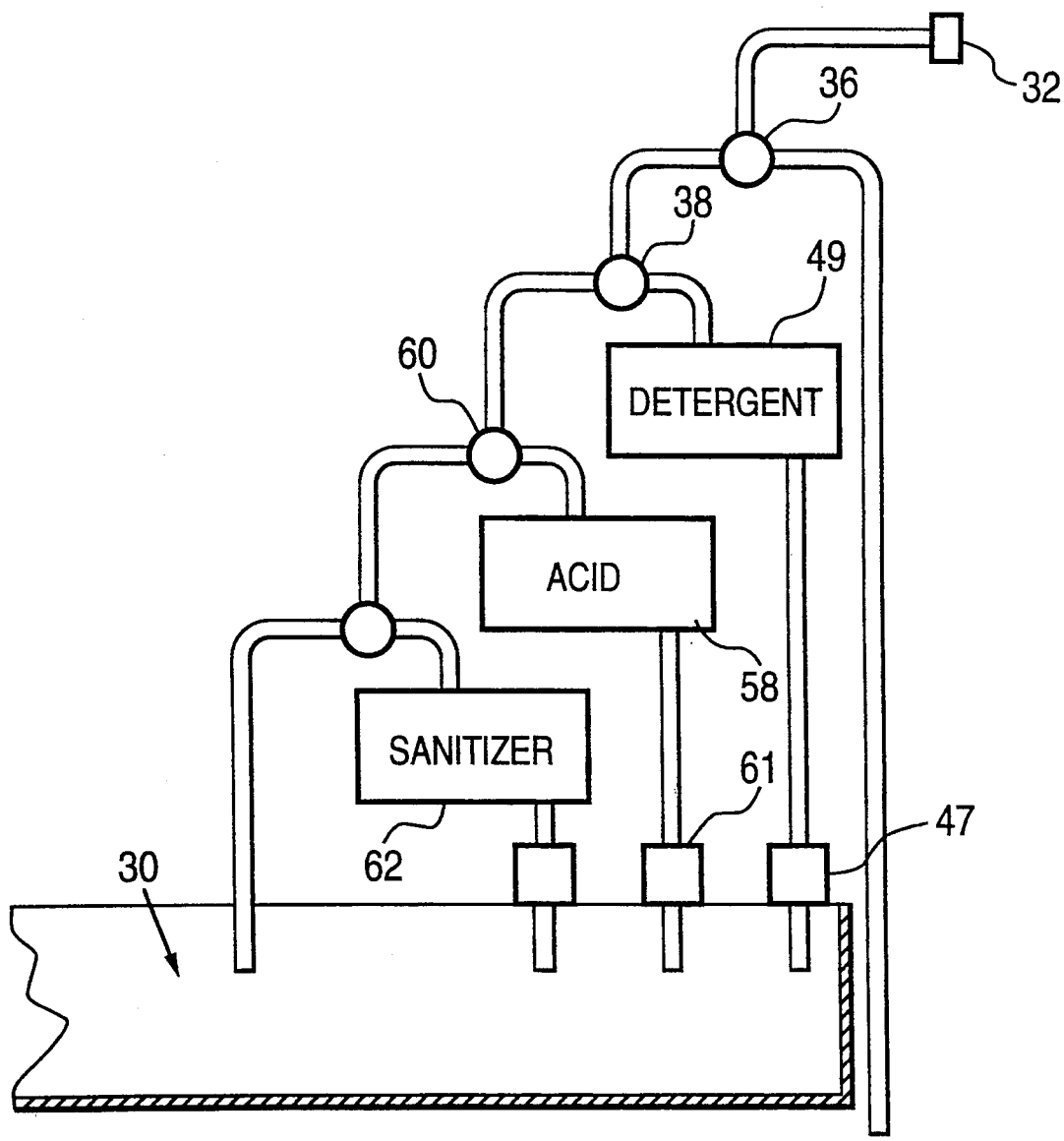
FIG. 3 is a diagram corresponding to a portion of FIG. 1, showing another alternative arrangement.

FIG. 3 shows another alternative arrangement of milking system, in which the liquid from the neutralising-flush-stage and the liquid from the sanitizer-flush-stage are also captured and stored between washes. A neutralising-liquid storage-tank 58 is added into the apparatus, and a further diverter valve 60 and an on/off valve 61 are added to control the flow. A similar tank 62 and associated components are provided in respect of the sanitizer-flush-liquid.

In the FIG. 3 system (and in the FIG. 1 system) the storage-tanks are shown in position above the milk-house sink, whereby the liquids from the tanks fall into the sink under gravity. Alternatively, the storage tanks may be located below the sink, and the liquids pumped into the sink when needed.

When initially setting up the system, there is no liquid in the detergent storage-tank 49. The detergent solution is made up by adding detergent to clean water, and the strength of the detergent solution initially should be approximately the same as that used in the conventional washing systems, as appropriate to the recommendations of the particular detergent supplier. As that solution is used, a determination is made of the strength of the remaining detergent solution. More detergent is added as required to make up the strength of the solution. The extra detergent may be added from a detergent box 63, which is positioned to dispense detergent into the storage tank 49, or it may be positioned to dispense the detergent directly into the sink 30.

The addition of the extra detergent may be determined by measurement of the pH of the detergent solution, or the addition may be done on the routine basis of a pre-determined quantity of extra detergent added per wash.

Finally, after a number of washes, the detergent solution has to be discarded, and a fresh batch of detergent solution made up. Again, the timing of this may be done by measurement, or as a pre-determined routine.

The efficacy of the detergent depends on its temperature. It is generally required that the contents of the detergent storage tank be heated prior to the detergent wash stage of the washing cycle.

Since the washing cycle is carried out shortly after the cows have been milked, at a time when the milk itself is more or less at its warmest, a potential for a saving in energy arises; the saving requires the use of a heat exchanger to extract heat from the milk, and to use that heat to heat the detergent. In fact, the milk in any event must be cooled, and the transfer of heat from the milk to the detergent is therefore a saving on both counts.

The bulk-holding-tank 27 of a dairy farm inevitably already has a built-in heat-exchanger in the form of a cooling coil in the tank, so that many of the components required to transfer heat from the holding tank to the storage tank are already present. The coolant from the cooling coil (not shown) in the holding tank 27 is led around a heating coil 65 placed in the storage tank 49. A supplementary heater 67 is included to ensure the detergent solution reaches the full operating temperature. The storage tank 49 should be provided with appropriate insulation to avoid wastage of heat.

The provision of a separate storage tank to contain the detergent solution has another benefit, as follows. It is only the detergent liquid that needs to be heated: the rinsing and flushing liquids do not need to be heated. By heating the detergent solution in the storage tank 49, there is now no need to include a heater in the milk-house sink 30. This is an advantage mechanically, because such a heater in the sink can be damaged as components are placed into and lifted out of the sink. It is an advantage from the energy saving standpoint also, if some of the heat from the previous wash is still retained at the time of the next wash.

In the apparatus as described, the valves and other control items are operated electrically. An electrical control panel 69 is included in the milk-house cleaning station 29, whereby the attendant can adjust the timing, sequencing, and interlocking of the apparatus for safe, optimised operation. Typically, the timing of the washing cycle would be: for the first-rinse-stage, about 5 minutes; for the detergent-wash-stage, about 12 minutes; and for the neutralising-flush and sanitizer-flush stages, about 6 minutes. In place of an automated system, control of the wash cycles can be left to the skill and observations of a careful attendant, but that would not be preferred.

The volume of the detergent solution liquid stored in the storage tank 49 should be approximately equal to the capacity of the pipelines and other components to be washed. Of course, more detergent solution than that may be provided if desired. If less solution were provided, all the liquid would be drawn into the components during washing, leaving the intakes of the milking units exposed to the air. Air would then be drawn into the system.

Indeed, air in the system can be beneficial, since the bubbles create turbulence in the pipelines and components, which serves to scour the surfaces clean. In some cases, a deliberate reduction is made of the volume of the detergent solution to about one third of the capacity of the components. In this case, during washing, two thirds of the volume of the components is filled with air bubbles. The air bubbles are seeking to expand into the vacuum, whereby large air bubbles do tend to draw the water along the pipelines at high speed. The resulting agitation and rapid movement of the liquid and of the bubbles adds to the efficiency of cleaning.

We claim:

1. Apparatus for washing components of a milking system which includes milk pipelines and milking units, wherein:

the apparatus includes a detergent-wash storage-tank, which is suitable for containing a batch of detergent-wash-liquid;

the apparatus includes a means for moving fluid in the components around the components;

the apparatus includes a flow-directing-valve, and a valve-controller so arranged as to enable three stages of operation of the apparatus, being a first-rinse-stage, a detergent-wash-stage, and a post-wash stage which includes a flush-stage;

in the first-rinse-stage, the valve controller is effective to arrange the flow-directing-valve to enable first-rinse-liquid present in the components to be discarded and discharged from the apparatus, and is effective to keep the first-rinse-liquid from mixing with the detergent-wash-liquid in the storage tank;

in the detergent-wash-stage, the valve-controller is effective to arrange the valve to enable the detergent-wash-liquid from the storage-tank to be circulated and re-circulated through the components, and is effective then to enable the detergent-wash-liquid to be transferred back into the storage-tank;

in the flush-stage, the valve-controller is effective to arrange the valve to enable neutralising-flush-liquid to be circulated through the components, and is effective to keep the flush-liquid from mixing with the detergent-wash-liquid in the storage-tank;

and wherein the apparatus includes a cooler for extracting heat from milk taken straight from cows, and the detergent-wash-liquid storage-tank is provided with a heat exchanger, which is so arranged as to receive heat extracted in the said cooler.

2. Procedure for washing components of a milking system which includes milk pipelines and milking units, wherein:

the procedure includes the step of providing a detergent-wash storage-tank, containing a batch of detergent-wash-liquid;

the procedure includes a wash-cycle having a first-rinse-stage, a detergent-wash-stage, and a post-wash stage including a flush-stage, in sequence;

the procedure includes carrying out the whole wash-cycle once after every milking;

in the first-rinse-stage, the procedure includes rinsing the components through with first-rinse-liquid, and then discarding and discharging the first-rinse-liquid completely away from the components, and includes the step of keeping the first-rinse-liquid from mixing with the detergent-wash-liquid in the storage tank;

in the detergent-wash-stage, the procedure includes circulating and re-circulating the detergent-wash-liquid from the storage-tank through the components, and includes the step of saving the batch of detergent-wash-liquid between wash-cycles by transferring same back into the storage-tank, whereby the batch of detergent-wash-liquid is stored in the storage-tank between milkings;

in the flush-stage, the procedure includes circulating flush-liquid through the components, and includes the step of keeping the flush-liquid from mixing with the detergent-wash-liquid in the storage-tank;

and the procedure includes the step of providing a flow-directing-valve and a valve-controller, and of arranging same to be effective to control the said rinsing through, the said discarding and discharging, the said keeping, the said circulating, the said saving, and the said storing of the said liquids.

3. Procedure of claim 2, wherein:

the procedure includes the step of providing an initial batch of detergent-wash-liquid comprising a mixture of clean water and an initial quantity of detergent;

the procedure includes the step of adding detergent to the detergent-wash-liquid between washes, and between milkings, by adding a make-up quantity of detergent to the liquid in the storage tank, the make-up quantity being substantially smaller than the initial quantity.

4. Procedure of claim 3, wherein the post-wash stage includes a sanitizer-flush-stage, in which the procedure includes circulating sanitizer-flush-liquid through the components, and includes the step of keeping the sanitizer-flush-liquid from mixing with the detergent-wash-liquid in the storage-tank.

5. Procedure of claim 3, wherein the step of adding small make-up quantities of detergent to the batch of detergent-wash-liquid is repeated for a number of milkings, after which the used batch of detergent-wash-liquid is discarded.

6. Procedure of claim 5, wherein the said number of milkings is six.

7. Procedure of claim 2, wherein, in the first-rinse-stage, the rinsing through of the components with the first-rinse-liquid continues until the first-rinse-liquid runs clear.

8. Apparatus for washing components of a milking system milking system which includes milk pipelines and milking units, wherein:

the apparatus includes a detergent-wash storage-tank, which is suitable for containing a batch of detergent-wash-liquid;

the apparatus includes a means for moving fluid in the components around the components;

the apparatus includes a flow-directing-valve, and a valve-controller so arranged as to perform three stages of operation of the apparatus, being a first-rinse-stage, a detergent-wash-stage, and a post-wash stage which includes a flush-stage;

in the first-rinse-stage, the valve-controller is effective to arrange the flow-directing-valve to circulate first-rinse-liquid through the components, and is effective then to arrange the flow-directing-valve to discard and discharge first-rinse-liquid present in the components out of the apparatus, and is effective to keep the first-rinse-liquid from mixing with the detergent-wash-liquid in the storage tank, and is effective to arrange the flow-directing valve to discharge the first-rinse-liquid from the apparatus, to the extent that the discharged first-rinse-liquid is not available for subsequent use in the apparatus;

in the detergent-wash-stage, the valve-controller is effective to arrange the valve to circulate and re-circulate the detergent-wash-liquid from the storage-tank through the components, and is effective then to transfer the detergent-wash-liquid back into the storage-tank;

in the flush-stage, the valve-controller is effective to arrange the valve to circulate flush-liquid through the components, and is effective to keep the flush-liquid from mixing with the detergent-wash-liquid in the storage-tank;

and the batch of detergent-wash liquid has a volume approximately equal to about one-third the volume capacity of the components to be cleaned.

9. Apparatus for washing components of a milking system which includes milk pipelines and milking units, wherein:

the apparatus includes a detergent-wash storage-tank, which is suitable for containing a batch of detergent-wash-liquid;

the apparatus includes a means for moving fluid in the components around the components;

the apparatus includes a flow-directing-valve, and a valve-controller so arranged as to perform three stages of operation of the apparatus, being a first-rinse-stage, a detergent-wash-stage, and a post-wash stage which includes a flush-stage;

in the first-rinse-stage, the valve-controller is effective to arrange the flow-directing-valve to circulate first-rinse-liquid through the components, and is effective then to arrange the flow-directing-valve to discard and discharge first-rinse-liquid present in the components out of the apparatus, and is effective to keep the first-rinse-liquid from mixing with the detergent-wash-liquid in the storage tank, and is effective to arrange the flow-directing valve to discharge the first-rinse-liquid from the apparatus, to the extent that the discharged first-rinse-liquid is not available for subsequent use in the apparatus;

in the detergent wash-stage, the valve-controller is effective to arrange the valve to circulate and re-circulate the detergent-wash-liquid from the storage-tank through the components, and is effective then to transfer the detergent-wash-liquid back into the storage-tank;

in the flush-stage, the valve-controller is effective to arrange the valve to circulate flush-liquid through the components, and is effective to keep the flush-liquid from mixing with the detergent-wash-liquid in the storage-tank.

10. Apparatus of clam 9, wherein the batch of detergent-wash-liquid has volume approximately equal to one-third the volume capacity of the components to be cleaned.

11. Apparatus of claim 9, wherein:

the apparatus includes a neutralising-flush-liquid storage tank, which is suitable for containing a batch of flush-liquid;

in the flush-stage, the valve-controller is effective to arrange the valve to circulate and recirculate flush-liquid from the flush-liquid-storage-tank through the components and is effective then to arrange the valve to transfer the flush-liquid back to the storage-tank.

12. Apparatus of claim 9, wherein:

the apparatus includes a sanitizer-flush-liquid storage tank, which is suitable for containing a batch of sanitizer-flush-liquid;

the post-wash stage includes a sanitizer-flush-stage;

in the sanitizer-flush-stage, the valve-controller is effective to arrange the valve to circulate and re-circulate sanitizer-flush-liquid from the sanitizer-flush-liquid storage-tank through the components, and is effective to arrange the valve then to transfer the sanitizer-flush-liquid back into the sanitizer-flush-liquid storage-tank.

13. Apparatus of claim 9, which includes an adjustable electrical control means, whereby timing, sequencing, and interlocking of the apparatus can be adjusted for safe, optimized operation.

14. Apparatus of claim 9, which includes a heater for heating the detergent-wash-liquid in the detergent-wash storage-tank.

* * * * *